Patented June 17, 1924.

1,498,359

UNITED STATES PATENT OFFICE.

HENRY P. DODGE, OF TOLEDO, OHIO.

BATTERY-PLATE BUILDING.

No Drawing.     Application filed February 23, 1923. Serial No. 620,845.

*To all whom it may concern:*

Be it known that I, HENRY P. DODGE, a citizen of the United States of America, residing at Toledo, Lucas County, Ohio, have invented new and useful Battery-Plate Buildings, of which the following is a specification.

This invention relates to secondary or storage batteries as to the active elements thereof.

This invention has utility when incorporated as a granular filler for the skeletons or grids of lead type of electric batteries, having advantages in capacity and for withstanding high current demand even under the adverse conditions of motor vehicle operations.

In carrying out the invention hereof, a source for the ingredients is economically available from sulphated or discarded lead type of electric storage batteries. In practice the scrap batteries are salvaged hereunder. A granular material is produced by grinding. The lead parts, as worn, ruptured, or defective plates, both positive and negative, with such filler as may still adhere therewith, and the precipitate or mud of material thrown off the plates in use and accumulated in the cell bottoms, are all worked together as a uniform mass. This is conveniently done by grinding, which need not be to a flour. In fact commercially desirable results are obtained by grinding to pass through a screen of sixty meshes per inch.

This uniform mixture of granular material including metallic lead, lead oxides and lead sulphates of various degrees, including insoluble lead sulphates, is made into a paste by the addition of water. A weak solution of sulphuric acid may be used, but a simple water addition to the granular mass will answer. As so wet, the paste is applied to fill the pockets or recesses in a lead or lead antimony grid or skeleton as a form for a battery plate. Such support or skeleton may be any type of plate form or carrier.

The filling of the paste granular material into the pockets or recesses of the grid or skeleton, is effected by smearing the paste well over the grid, and then rolling thereinto by passing the grid between canvas covered rolls effective for squeezing or pressing the granular substance into active element carrying positions or portions of the plate. The pockets are accordingly filled by a uniform pressing thereinto of the paste granular material, while the exterior surface is rough as imprinted by the fabric facing of the rolls.

Such plates are assembled in cells and placed under charge. The positive plates are oxidized as to the active elements, while the negative plates have the active material thereof converted into a porous metallic lead. In practice this charging brings about an exuding or efflorescing of white insoluble material from the treated plates and precipitates to the bottom of cell or charging vat chamber. The positive plates are the ones undergoing the harder usage in operation. This treatment, which seems to be a rejection of insoluble sulphate uniformly from the interior of this granular paste of lead battery scrap, leaves the plate firm and substantial, while porous. This porous character of the plate exposes increased surface area for electrolytic action, and accordingly per unit of mass gives the plate greater capacity for discharge amperage, even sustained for a long period of time. The changes as effecting the plate in charging and discharging tend to swell or change the volume of the active element or material. Superficially such swell action herein is reduced or minimized to an extent that deleterious results therefrom are avoided. Seemingly, the swellings or volume changes herein are largely compensated in the porous body of the active element. This increase in bulk, or tendency there-toward is also present to a degree in the negative plate, and is neutralized thereon, as well as on the positive plate.

Furthermore, the rejection of the insoluble sulphates or whatever such rejection material may be to leave the plates porous, leaves as the porous residue, material electro-active or inherently purified in its susceptibility to the electrolytic action of charging and discharging in storage battery operations. It all readily reverts from one stage to the other, and with a minimum of strain on the plate. The paste or adherent approximates the normal or average condition of the plate, and thus is not under strain tending to weaken its structure to the degree a sulphate free active element would be subjected to.

It is to be borne in mind that the scrap material herein, notwithstanding that some thereof may be the subdivided frame, support or grid, has all had what may be termed electrolytic purification. At least in so far as there may be impurities or portions thereof which may be nonsusceptible, or not actively susceptible to electrolytic action, the previous battery experience has operated for largely eliminating such portions, or to have such portions in a state as to be at once eliminated as the filler hereunder is placed under charge, thereby working to serve a useful purpose hereunder of increasing porosity for more uniform and thorough penetration of the electrolytic response of the plates hereunder. With metallic lead, even subdivided for filler use, without the electrolytic experience of battery service or electrolytic acceptance or rejection, there is not the capacity and average volume with physical stability as herein found. Metallic lead is much slower to respond than the scrap hereunder, even under a similar degree of subdivision.

What is claimed and it is desired to secure by Letters Patent is:

1. A secondary battery plate for charging embodying a skeleton and a filler therefor of insoluble lead sulphate uniformly distributed therethrough.

2. A lead battery active material of granular refuse from lead batteries.

3. A lead battery plate embodying a lead skeleton and a battery scrap lead filler.

4. A filler for storage battery grids comprising granular sulphated battery material assembled as a paste therein.

5. A composite active element filler for lead battery plates, said filler including metallic lead, lead oxid and lead sulphate of an initial applied volume approximating subsequent use volume, for rendering initial press anchoring thereof stable against charging and discharging disturbance.

In witness whereof I affix my signature.

HENRY P. DODGE.